United States Patent [19]
Sapir et al.

[11] Patent Number: 5,717,931
[45] Date of Patent: Feb. 10, 1998

[54] METHOD AND APPARATUS FOR COMMUNICATING BETWEEN MASTER AND SLAVE ELECTRONIC DEVICES WHERE THE SLAVE DEVICE MAY BE HAZARDOUS

[75] Inventors: Adi Sapir, Tel Aviv; Ilan Pardo, Ramat-Hasharon, both of Israel; James B. Eifert, Austin, Tex.; Wallace B. Harwood, III, Austin, Tex.; John J. Vaglica, Austin, Tex.; Danny Shterman, Petach-Tikva, Israel

[73] Assignee: Motorola, Inc., Schaumburg, Ill.

[21] Appl. No.: 359,969

[22] Filed: Dec. 20, 1994

[51] Int. Cl.⁶ .................................................. G06F 9/40
[52] U.S. Cl. .................. 395/728; 395/200.05; 395/290; 395/280; 395/729
[58] Field of Search .................... 395/200.05, 290, 395/481, 728, 821, 427, 280, 325, 375, 800, 465, 729

[56] References Cited

U.S. PATENT DOCUMENTS

| | | |
|---|---|---|
| 4,407,016 | 9/1983 | Bayliss et al. . |
| 4,851,990 | 7/1989 | Johnson et al. . |
| 4,926,323 | 5/1990 | Baror et al. . |
| 5,084,814 | 1/1992 | Vaglica et al. . |
| 5,131,085 | 7/1992 | Eikill et al. . |
| 5,187,794 | 2/1993 | Hall . |
| 5,309,567 | 5/1994 | Mizukami . |
| 5,327,537 | 7/1994 | Corcoran et al. . |
| 5,448,744 | 9/1995 | Eifert et al. . |
| 5,499,385 | 3/1996 | Farmwald et al. . |

*Primary Examiner*—Jack B. Harvey
*Assistant Examiner*—Rupal D. Dharia
*Attorney, Agent, or Firm*—Susan C. Hill; Bruce E. Hayden

[57] ABSTRACT

A master device (11) can access slave devices (12) either speculatively or non-speculatively. The slave devices (12) can be either non-hazardous devices or hazardous devices which exhibit status changes on reading. The master device (11) issues an access request including information as to whether the request is speculative or non-speculative, the slave device (12) then responds to the master device (11) with a negative acknowledgment that access is denied if the access request is speculative and the slave device (12) is hazardous. Otherwise, if the slave device (12) can deal with the request, a positive acknowledgment is sent. If the master device (11) receives a negative acknowledgment, it continues to reissue updated access requests until a positive acknowledgment is received.

15 Claims, 4 Drawing Sheets

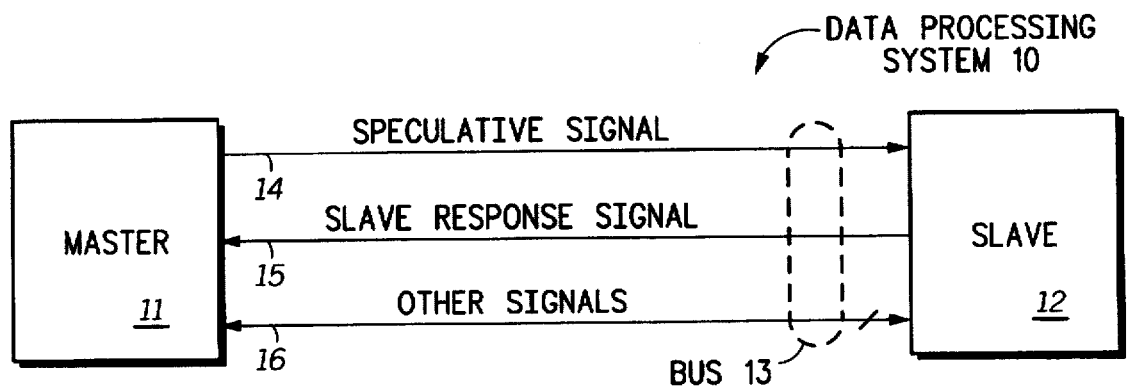

FIG.1

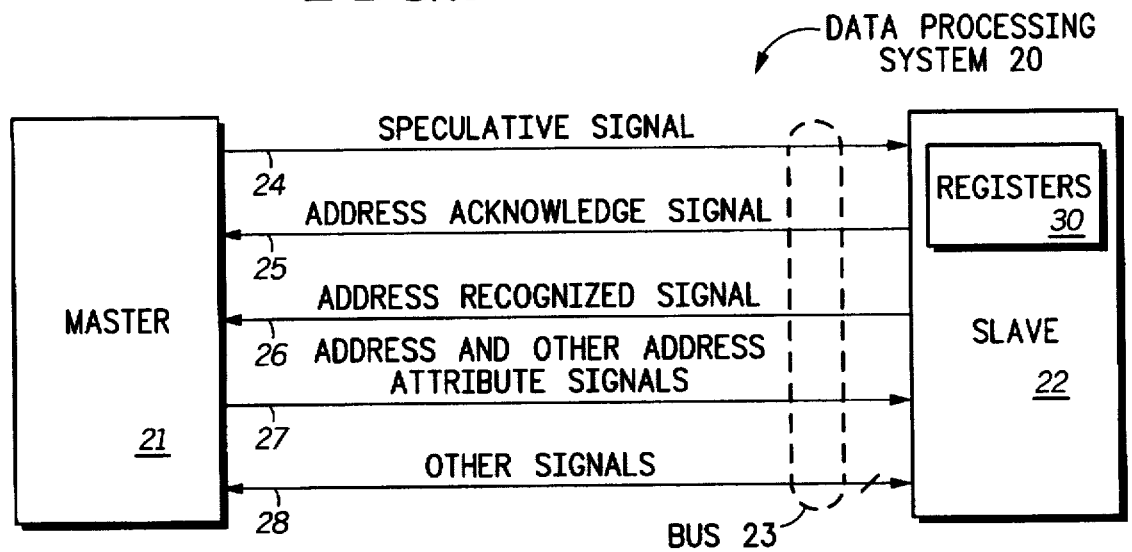

FIG.2

| SIGNAL STATES DURING BUS CYCLE ACCESSING SLAVE DEVICE 22 | | INFORMATION COMMUNICATED FROM SLAVE DEVICE 22 TO MASTER DEVICE 21 |
| --- | --- | --- |
| ADDRESS RECOGNIZED SIGNAL 26 ASSERTED | ADDRESS ACKNOWLEDGE SIGNAL 25 ASSERTED | |
| NO | DON'T CARE | NO SLAVE DEVICE IS LOCATED AT THE SPECIFIED ADDRESS |
| YES | NO | NEGATIVE ACKNOWLEDGE (MASTER MAY RETRY ACCESS) |
| YES | YES | POSITIVE ACKNOWLEDGE (SLAVE HAS ACCEPTED ACCESS) |

FIG.3

METHOD AND APPARATUS FOR COMMUNICATING BETWEEN MASTER AND SLAVE ELECTRONIC DEVICES WHERE THE SLAVE DEVICE MAY BE HAZARDOUS

FIELD OF THE INVENTION

The present invention relates in general to a data processing system, and more particularly to a method and apparatus for communicating between master and slave electronic devices where the slave device may be hazardous.

BACKGROUND OF THE INVENTION

In many electronic systems, for example, in data processing systems, a master device, such as a processor needs to communicate with one or more slave devices, such as memory, in order to access data, such as instruction commands, stored in the slave device. In many systems, the access request made by the master device can be either "speculative", meaning that the request is made in advance of the master device having actually completed the previous instruction, but the request is made in anticipation of the data being required; or, the access request made by the master device can be "non-speculative", meaning that the request is made after the previous instruction has been completed and the master device is ready to proceed with the new data.

For example, in some known data processing systems, a processor which can execute several instructions at once can speculatively access subsequent instructions and execute fast ones even though a slow current instruction being executed may not yet be completed. In such cases, the results of the subsequent, faster instructions must be temporarily stored and not sent out by the processor as completed as they may affect further processing dependent on the result of the still pending slower instruction. Furthermore, if the slower instruction does not finish, e.g. an error occurs, then the results of the faster instructions must be disregarded and any values affected by those results reset to their original values.

As is well known, some memory devices can be simply read, or accessed, without affecting the data being read. However, the act of reading other, more hazardous, memory devices, such as certain status registers, can affect the data being read. Some status registers bits are cleared by reading the status register while the status bits are in the asserted state, and then writing a predetermined value to the status register. Also, some FIFO (first in first out) registers are cleared or advanced by a read access.

Thus, a "hazardous" device is a device in which the information stored may be affected by a read access, while a "non-hazardous" device is a device in which the information stored remains unaffected by a read access. Therefore, if a hazardous memory device is speculatively accessed and then the slower, previous instruction does not complete, there may be a problem in returning the hazardous device to its original state (i.e. the state the hazardous device had before the speculative access occurred).

BRIEF DESCRIPTION OF THE DRAWINGS

FIG. 1 illustrates, in block diagram form, a data processing system 10 in accordance with one embodiment of the present invention;

FIG. 2 illustrates, in block diagram form, a data processing system 20 in accordance with an alternate embodiment of the present invention;

FIG. 3 illustrates, in tabular form, a behavior of data processing system 20 of FIG. 2 in accordance with one embodiment of the present invention;

DESCRIPTION OF THE PREFERRED EMBODIMENT

Figure 4:
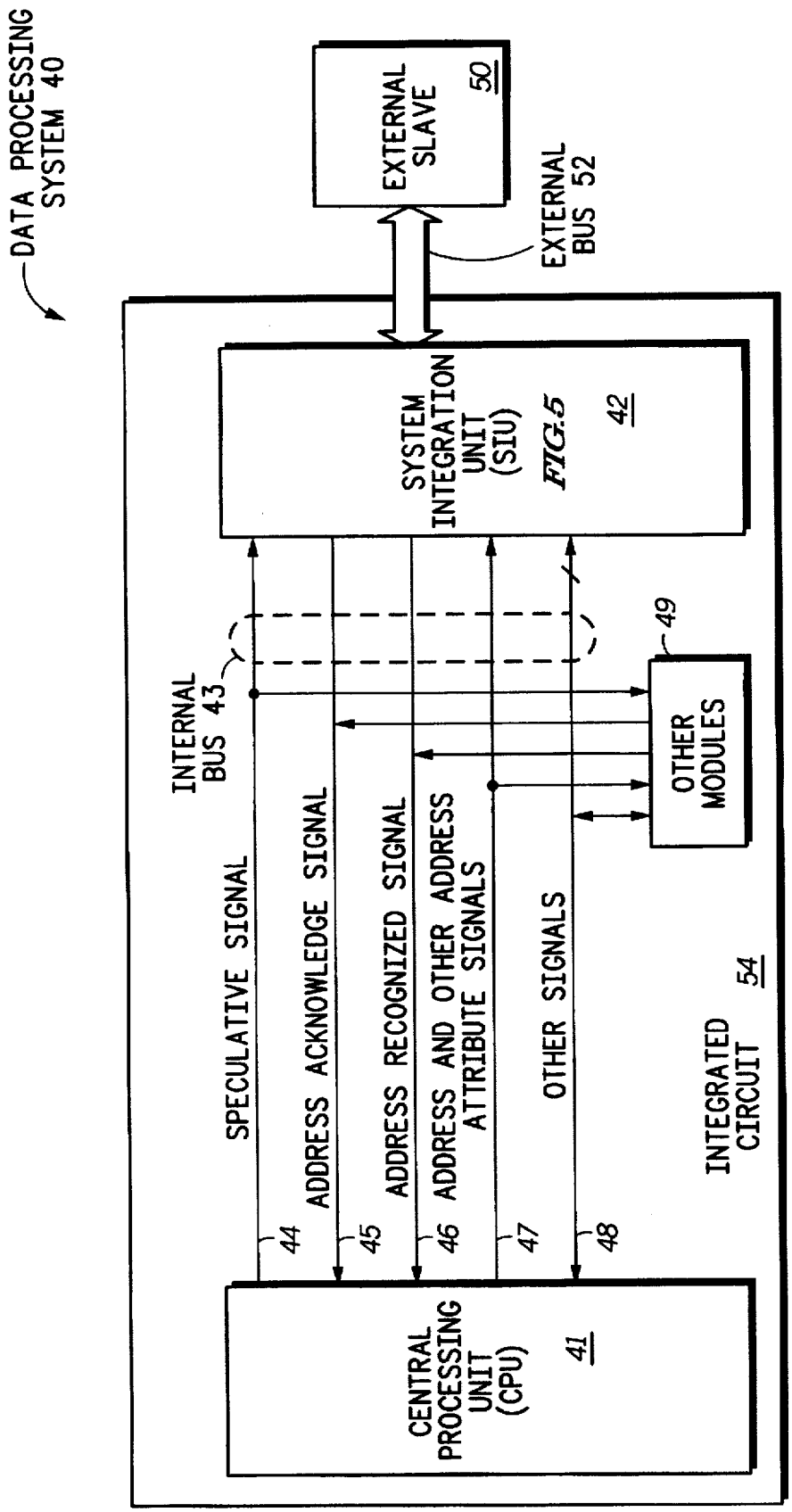
FIG. 4 illustrates, in block diagram form, a data processing system 40 in accordance with an alternate embodiment of the present invention.

The present invention provides a method and apparatus for handling speculative accesses to hazardous devices. The present invention also allows various combinations of accesses, such as both speculative accesses and non-speculative accesses to both hazardous and non-hazardous devices.

In one embodiment of the present invention, a master device provides a speculative/non-speculative signal to the one or more slave devices during a bus cycle which accesses one or more of the slave devices. This speculative/non-speculative signal provides the information to the slave devices as to whether that particular bus cycle is speculative or non-speculative. Alternate embodiments of the present invention may encode the speculative/non-speculative information and may provide it from the master to the slaves by way of a plurality of signals, rather than by way of a single signal.

The slave device responds by providing a response signal to the master which indicates whether the slave has accepted the access, or whether the slave has not accepted the access but the master may retry the access again during a subsequent bus cycle. An alternate embodiment may instead accept the bus cycle but delay completion of the bus cycle until the access is no longer speculative. If a slave device is hazardous and the access is speculative, the slave device provides a response signal to the master which indicates that the slave has not accepted the access but that the master may retry the access again during a subsequent bus cycle.

Because write accesses usually affect a value stored in a slave device, speculative write accesses are always held off until they are non-speculative. Read accesses on the other hand, usually do not affect values stored in a slave device, and thus are selectively held off, based upon whether the slave device is hazardous.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

DESCRIPTION OF THE FIGURES

FIG. 1 illustrates a data processing system 10 that includes a master 11 and one or more slave devices 12 which are bi-directionally coupled by way of bus 13. Bus 13 includes a speculative signal that is provided by master 11 to slave 12 by way of conductor 14, a slave response signal that is provided by slave 12 to master 11 by way of conductor 15, and other signals which are provided by way of conductors 16. The other signals 16 may all be provided by master 11 to slave 12, or alternately, some of other signals 16 may be provided by master 11 while the remaining other signals 16 may be provided by slave 12.

FIG. 2 illustrates a data processing system 20 that includes a master 21 and one or more slave devices 22 which are bi-directionally coupled by way of bus 23. Also, data processing system 20 may include one or more masters 21. If multiple masters 21 and slaves 22 are included, bus signals 23 are coupled to each master 21 and each slave 22. Note that any embodiment of the present invention, not just the embodiment illustrated in FIG. 2, may have multiple masters and/or multiple slaves.

Bus 23 includes a speculative signal that is provided by master 21 to slave 22 by way of conductor 24, an address acknowledge signal that is provided by slave 22 to master 21 by way of conductor 25, an address recognized signal that is provided by slave 22 to master 21 by way of conductor 26, address and other address attribute signals that are provided by master 21 to slave 22 by way of conductors 27, and other signals which are provided by way of conductors 28. The other signals 28 may all be provided by master 21 to slave 22, or alternately, some of other signals 28 may be provided by master 21 while the remaining other signals 28 may be provided by slave 22. Slave 22 includes registers 30.

FIG. 3 illustrates a behavior of data processing system 20 of FIG. 2 in accordance with one embodiment of the present invention.

FIG. 4 illustrates a data processing system 40 that includes an integrated circuit 54 which is bi-directionally coupled to one or more external slave devices 50 by way of external bus 52. Integrated circuit 54 includes a central processing unit (CPU) 41 which may operate as a master. Integrated circuit 54 also includes system integration unit (SIU) 42 and other modules 49 which are bi-directionally coupled to CPU 41 by way of internal bus 43.

Internal bus 43 includes a speculative signal that is provided by CPU 41 to SIU 42 by way of conductor 44, an address acknowledge signal that is provided by SIU 42 to CPU 41 by way of conductor 45, an address recognized signal that is provided by SIU 42 to CPU 41 by way of conductor 46, address and other address attribute signals that are provided by CPU 41 to SIU 42 by way of conductors 47, and other signals which are provided by way of conductors 48. The other signals 48 may all be provided by CPU 41, or alternately, some of other signals 48 may be provided by CPU 41 while the remaining other signals 48 may be provided by SIU 42 or other modules 49.

Figure 5:
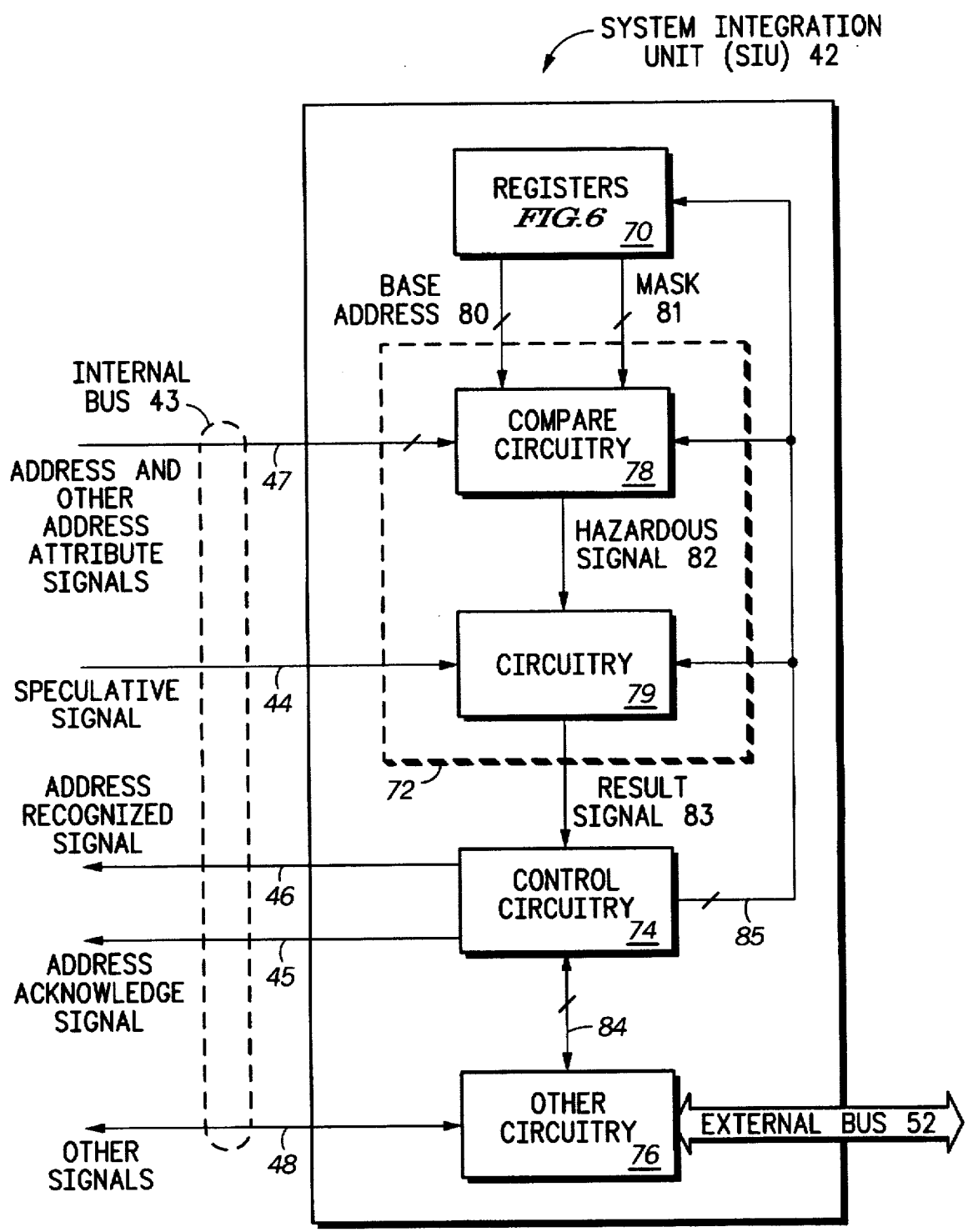
FIG. 5 illustrates, in block diagram form, a system integration unit 42 of FIG. 4 in accordance with one embodiment of the present invention.

FIG. 5 illustrates a system integration unit (SIU) 42 of FIG. 4 in accordance with one embodiment of the present invention. SIU 42 includes registers 70 which provide one or more base address signals to compare circuitry 78 by way of conductor(s) 80. Registers 70 also provide one or more mask signals to compare circuitry 78 by way of conductor(s) 81. Registers 70 are coupled to control circuitry 74 and other circuitry 76 by way of conductors 85 and 84 so that registers 70 may be read accessed and write accessed by way of internal bus 43.

Compare circuitry 78 receives address and other address attribute signals 47 from internal bus 43, optionally receives control signals 85 from control circuitry 74, and provides a hazardous signal to circuitry 79 by way of conductor 82. Circuitry 79 receives the speculative signal 44 from internal bus 43, optionally receives control signals 85 from control circuitry 74, and provides a result signal to control circuitry 74 by way of conductor 83. Compare circuitry 78 and circuitry 79 together form a circuit 72 which may optionally receive control signals 85 from control circuitry 74.

Control circuitry 74 provides address recognized signal 46 and address acknowledge signal 45 to internal bus 43.

Control circuitry 74 is bi-directionally coupled to other circuitry 76 by way of conductors 84. Other circuitry 76 receives and provides other signals 48 to internal bus 43. Other circuitry 76 also receives and provides external bus signals to external bus 52.

Figure 6:
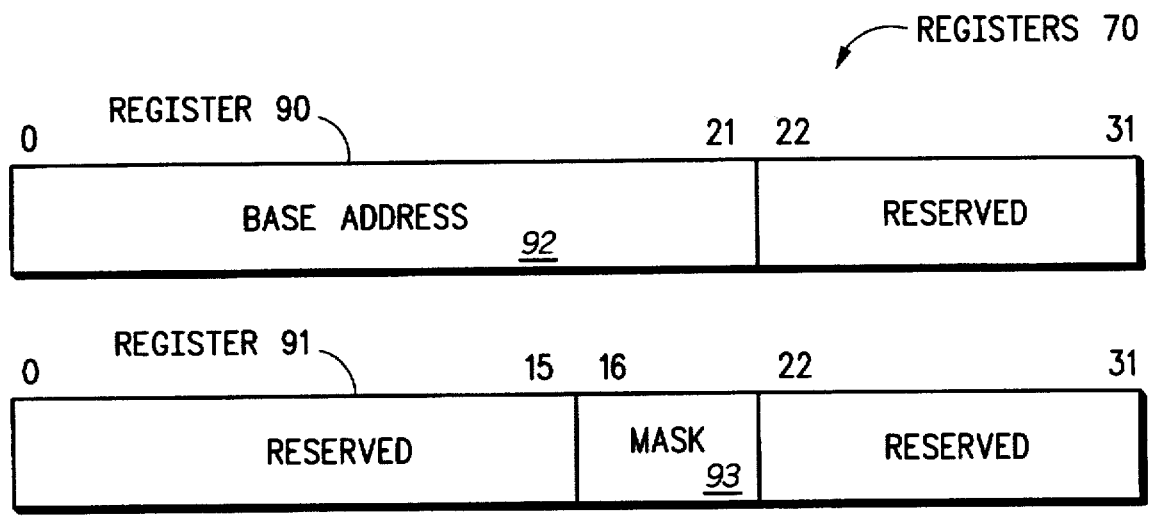
FIG. 6 illustrates, in block diagram form, registers 70 of FIG. 5 in accordance with one embodiment of the present invention.

FIG. 6 illustrates registers 70 of FIG. 5 in accordance with one embodiment of the present invention. In one embodiment, registers 70 include register 90 and register 91. Register 90 includes a bit field 92 which stores a base address value. Register 91 includes a bit field 93 which stores a mask value. The bit fields in registers 70 which are marked as reserved are reserved for other functions.

Figure 7:
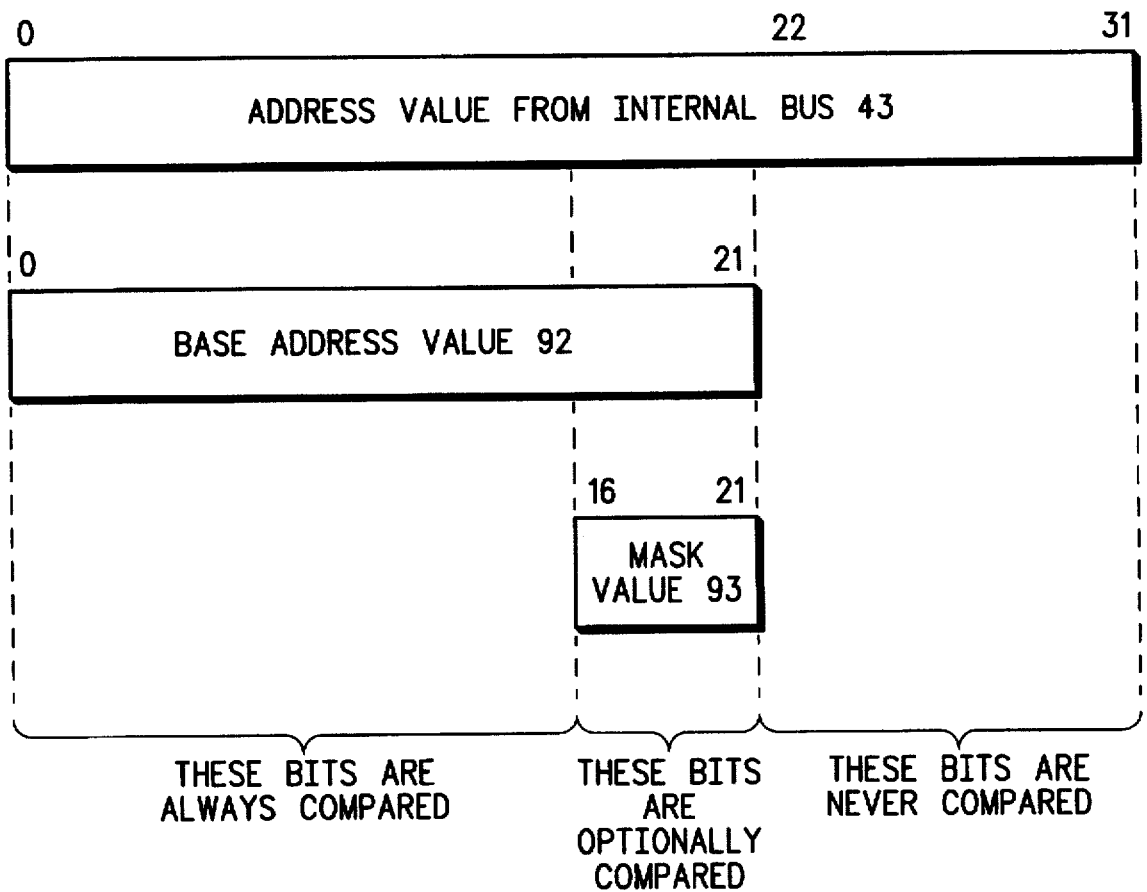
FIG. 7 illustrates, in block diagram form, a comparison between address values in accordance with one embodiment of the present invention.

FIG. 7 illustrates, in block diagram form, a comparison between address values in accordance with one embodiment of the present invention.

OPERATION OF THE PREFERRED EMBODIMENT

The operation of the present invention will now be discussed. The present invention provides a method and apparatus to handle speculative accesses to hazardous devices.

A speculative access is an access that is requested in advance of the master device having actually completed the previous instruction; the request is made in anticipation of the data being required. A non-speculative access is an access that is requested after the previous instruction has been completed and the master device is ready to proceed with the new data. A processor which can execute several instructions at once (e.g. a pipelined processor) can speculatively access subsequent instructions and execute fast ones even though a slow current instruction being executed may not yet be completed. However, the speculatively executed instructions may never be properly completed, and thus the state of the speculatively accessed slave device may need to be returned to its original state (i.e. its state before the speculative access took place).

Although some slave devices can be simply read, or accessed, without affecting the data being read, the act of reading other, hazardous, slave devices (e.g. status registers or FIFO registers) can affect the data being read. Thus, if a hazardous slave device is speculatively accessed and then the speculative instruction does not complete, there may be a problem in returning the state of the hazardous slave device to the pre-access value.

Referring to FIG. 1, in one embodiment of the present invention, communication between a master device 11 and a slave storage device 12 via a bus 13 involves the master device 11 issuing a request onto the bus 13 by way of signals 14 and 16. The request includes a speculative signal 14 that indicates whether the request is speculative or non-speculative. The request is received by the slave device 12.

The slave device 12 is either a simple memory type device for which the act of reading does not affect the data being read, or a device in which the act of reading data involves a hazard such that the data might or will be altered. If the slave device 12 is a simple memory device, it does not matter whether the request is speculative or not, and therefore the slave device 12 issues either a positive acknowledgment back onto the bus 13 that it has read the request and is proceeding to deal with it, or a negative acknowledgment that it cannot currently deal with it, for example because it is busy being accessed for another purpose. The slave device 12 provides its response to master 11 by way of slave response signal 15.

The master device 11 then receives the acknowledgment, i.e. slave response signal 15, and determines from signal 15 that either: (1) the request has been accepted by the slave 12; or that (2) the master device 11 may continue to reissue the request until the master device 11 receives a positive acknowledgment that the request has been accepted.

If, on the other hand, the slave device 12 is a hazardous device, then, knowing that it is a hazardous device, the slave device 12 determines whether or not the request is speculative.

If the slave device 12 determines that the request is not speculative, and if the slave device is available to respond to the access, the slave device 12 issues a positive acknowledgment back onto bus 13 by way of the slave response signal 15. In one embodiment of the present invention, this positive acknowledgment is the assertion of the slave response signal 15. When master 11 receives the positive acknowledgment (i.e. slave response signal 15 is asserted), master 11 then knows that the slave device 12 has received the request and that the slave device 12 is available for the requested access.

If, for some reason, the slave device 12 cannot deal with the non-speculative request, then a negative acknowledgment is returned to the master device 11 indicating that the request cannot be dealt with at that time and the master device 11 continues to reissue the request until it receives a positive acknowledgment that the request can be dealt with.

If the slave device 12 determines that the request is speculative, then, knowing that the slave device 12 is a hazardous device in which the data could be affected by reading it, the slave device 12 sends back the same negative acknowledgment as though it was busy, and the master device 11 continues to reissue the request. However, of course, at some point in time, the request reissued by the master device 11 will be updated to indicate that the request is non-speculative. As long as the hazardous slave device 12 receives the speculative request it continues to send back the negative acknowledgment. However, as soon as the request is updated to be non-speculative, then, provided the slave device 12 can deal with it, the slave device 12 sends back the positive acknowledgment.

Thus, the master device 11 does not need to know whether the slave device 12 is hazardous or not. This allows the slave device 12 to be replaced by another device irrespective of whether it is of the same simple or hazardous type, without the master device 11 having to be programmed to know the type of slave device 12, as is the case in a number of known systems where the master device 11 must be provided with a memory map indicating which memory devices are simple and which are hazardous, or guarded. Slave 12 may be any type of slave device, including memory devices, peripheral devices, other modules on a same integrated circuit, etc. Master 11 may be any type of bus master, including a data processor such as a central processing unit. Other signals 16 may include address signal, data signals, and various control signals.

Still referring to FIG. 1, slave 12 provides a positive acknowledgment by asserting the slave response signal 15. Slave 12 provides a negative acknowledgment by not asserting the slave response signal 15, but by instead leaving the slave response signal 15 in its default, negated state. If master 11 receives a positive acknowledgment, master 11 knows that slave 12 has accepted the bus cycle and the bus cycle is completed normally. However, if master 11 receives a negative acknowledgment, master 11 knows that slave 12 has not accepted the bus cycle; thus, master 11 does not complete the read access during the present bus cycle, but instead master 11 may optionally retry the read access during a future bus cycle.

FIG. 2 illustrates an alternate embodiment of the present invention in which the slave response signals are implemented using two signals, namely an address acknowledge signal 25 and an address recognized signal 26. In alternate embodiments of the present invention, slave 22 may use more or different signals to provide a response to master 21. Address and other address attribute signals 27 provide the address value to slave 22 as well as various address attributes such as, for example, read/write, supervisor/user, bus cycle start, and size.

Slave 22 may be any type of slave device, including memory devices, peripheral devices, other modules on a same integrated circuit, etc. In one embodiment, slave device 22 is a hazardous device because read accesses to registers 30 may alter the state of bits within registers 30. Master 21 may be any type of bus master, including a data processor such as a central processing unit. Other signals 28 may include data signals and various control signals.

FIG. 3 illustrates the information that slave device 22 conveys to master device 21 by way of the address acknowledge signal 25 and the address recognized signal 26 (see FIG. 2). The default state of the address recognized signal 26 is the negated state. If there is no slave device 22 located at the address "X" provided by master 21 on a portion of conductors 27, then there will be no slave device 22 to respond and assert the address recognized signal 26. If the master 21 initiates a bus cycle to a slave device at address "X" and the slave device does not respond by asserting the address recognized signal 26, then the master 21 will assume that there is no slave device located at address "X". Note that if the address recognized signal 26 is not asserted by slave 22, the logic state of the address acknowledge signal 25 is ignored by master 21 (i.e. is a don't care).

However, if there is a slave device 22 located at the address "X" provided by master 21 on a portion of conductors 27, then there is a slave device 22 to respond and assert the address recognized signal 26. If the master 21 initiates a bus cycle to a slave device at address "X" and the slave device responds by asserting the address recognized signal 26, then the master 21 will assume that there is a slave device located at address "X".

If the address recognized signal 26 is asserted, then the master 21 will also look at the logic state of the address acknowledge signal 25. If the slave device 22 responds by leaving the address acknowledge signal 25 negated, then the master 21 will assume that the slave 22 has not accepted the access and that the master 21 may retry the access during a subsequent bus cycle. However, if the slave device 22 responds by asserting the address acknowledge signal 25, then the master 21 will assume that the slave 22 has accepted the access and that the master 21 may continue with the present bus cycle.

FIG. 4 illustrates an alternate embodiment of the present invention in which the slave device 50 is located external to the integrated circuit 54 containing the bus master (i.e. CPU 41). In this embodiment of the present invention, SIU 42 acts as an interface or bus intermediary between the master device (CPU 41) and the slave device (external slave 50). The SIU 42 provides all of the required slave response signals to CPU 41, namely address acknowledge signal 45 and address recognized signal 46.

In addition, the SIU 42 is programmed with the information as to which address ranges, and thus which external slave devices, are hazardous and which are not hazardous. As a result, external slave 50 does not require special circuitry to implement the present invention; instead, the special circuitry may be included in the SIU 42 on the same integrated circuit as the master 41. Thus, the external bus 52 may be a standard bus and does not require any new signals or any modifications in order to handle speculative accesses to hazardous slave devices, such as external slave 50.

In the embodiment illustrated in FIG. 4, neither the master device 41 nor the slave device 50 need to be programmed with the information as to whether the slave device 50 is hazardous or not. Only SIU 42 needs to be programmed with the information as to whether the slave device 50 is hazardous or not. This allows the slave device 50 to be replaced by another device irrespective of whether it is of the same non-hazardous or hazardous type, without the master device 41 having to be programmed to know the type of slave device 50. So instead of having to change the software executed by CPU 41, a minor change in the programming of the registers in SIU 42 can handle a change from a non-hazardous device to a hazardous device, and vis versa.

The interface between CPU 41 and SIU 42 may operate in the same manner as the interface between master 21 and slave 22, as illustrated in FIG. 2 and described above. The interface between SIU 42 and external slave 50 is by way of a standard prior art external bus 52.

FIGS. 5 and 6 illustrate one embodiment of the SIU 42 of FIG. 4. User programmable registers 70 store a base address value 92 and a mask value 93. Alternate embodiments of the present invention may use any type of storage circuit for registers 70, and the base address value 92 and the mask value 93 may be any number of bits in length and may be located anywhere within the storage circuit. In addition, alternate embodiments of the present invention may use a base address value 92 without a mask value 93.

In one embodiment of the present invention, the base address value 92 and the mask value 93 are used as illustrated in FIG. 7. The base address value 92 is compared on a bit-by-bit basis to the corresponding bits of the address value received by SIU 42 from internal bus 43 by way of conductors 47. In the embodiment illustrated in FIG. 7, the address value received from internal bus 43 is thirty-two bits in length while the base address value 92 is twenty-two bits in length. In alternate embodiments of the present invention, the base address value 92 may be any number of bits. Also, different bit-wise mappings may be made, such as, for example, bit N of the base address value may be compared with bit (N+10) of the address value from the internal bus.

In the embodiment of the present invention illustrated in FIG. 7, a mask value 93 is also used to affect the bitwise comparison between the address value from internal bus 43 and the base address value 92. The mask value 93 may be used to affect the comparison in a variety of ways, depending upon the embodiment. In one embodiment, the mask value is used as a bitwise mask, so that if bit N of the mask is a logic level one, the comparison is enabled between bit N of the address value from internal bus 43 and bit N of the base address value 92. And if bit N of the mask is a logic level zero, the comparison is disabled between bit N of the address value from internal bus 43 and bit N of the base address value 92. Alternate embodiments of the present invention may use the mask value 93 in other ways to selectively enable and disable the bitwise comparison of certain bits.

Note that in the embodiment of the present invention illustrated in FIG. 7, bits 0–15 of the address value from internal bus 43 are always compared to bits 0–15 of the base address value 92; bits 16–21 of the address value from internal bus 43 are optionally compared to bits 0–15 of the base address value 92, depending upon the value of the corresponding bit of mask value 93; and bits 22–32 of the address value from internal bus 43 are never compared to any other value. The net affect of this comparison scheme is that a user may programmably partition the memory map into multiple blocks of varying sizes where one or more of the memory blocks is hazardous. Alternate embodiments may include the option of having no memory blocks for hazardous devices. Alternate embodiments of the present invention may use a variety of different comparison schemes; the comparison scheme illustrated in FIG. 7 is just one example.

Referring to FIG. 5, circuit 72 receives the base address value and the mask value from registers 70, and receives the bus address value and the speculative signal from internal bus 43. Compare circuit 78 compares a portion of the incoming address from bus 43 to the portion of the base address value specified by the mask value. In one embodiment of the present invention, circuit 72 may also contain circuitry (not shown) which specifies whether or not a particular set of addresses belongs to a hazardous or non-hazardous device.

In an alternate embodiment of the present invention, all addresses which produce a comparison match are considered to be hazardous, while all addresses which do not produce a comparison match are considered to be non-hazardous. So if the comparison between the address value from internal bus 43 and the base address value 92 produces a match, the hazardous signal 82 is asserted. And if the comparison between the address value from internal bus 43 and the base address value 92 does not produce a match, the hazardous signal 82 is negated.

Circuitry 79 asserts the result signal 83 if: (1) the hazardous signal 82 is asserted (i.e. the external slave device 50 corresponding to the address on bus 43 is a hazardous device); and (2) the speculative signal 44 is asserted (i.e. CPU 41 indicates that the present access to external slave device 50 is speculative). Circuit 72 may be implemented in a wide variety of ways, for example, the functionality of compare circuitry 78 and circuitry 79 may be combined. Control circuit 74 may optionally provide timing or other control information to circuit 72.

When the result signal 83 is asserted, control circuitry 74 asserts the address recognized signal 46 and the address acknowledge signal 45 at the appropriate time on internal bus 43. The timing of the various signals on internal bus 43 is independent of the present invention and may vary from one bus protocol to another.

If SIU 42 determines that the access is speculative and is to a hazardous slave device (e.g. external slave 50 in FIG. 4), then SIU 42 asserts the address recognized signal 46, but leaves the address acknowledge signal 45 negated. CPU 41 may then retry the same access to the hazardous slave device at a later time. When a subsequent access to that same hazardous device becomes non-speculative, then the SIU 42 asserts the address recognized signal 46 and also asserts the address acknowledge signal 45.

If SIU 42 is available for an access and determines that the access is to a non-hazardous slave device (e.g. a different external slave 50 in FIG. 4), then SIU 42 asserts the address recognized signal 46 and also asserts the address acknowledge signal 45, regardless of whether or not the access is speculative.

It will be appreciated that although only certain embodiments of the invention have been described in detail, various modifications and improvements can be made by a person skilled in the art without departing from the scope of the present invention. It is to be understood, therefore, that this invention is not limited to the particular forms illustrated and that the appended claims cover all modifications that do not depart from the spirit and scope of this invention.

We claim:

1. A method of accessing slave storage devices by a master device, the access being either speculative or non-speculative and the storage devices being either simple memory devices or hazardous devices which exhibit status changes on reading, the method comprising the steps of:

the master device issuing an access request including information as to whether the request is speculative or non-speculative;

the slave storage device responding to the master device with a negative acknowledgment that access is denied if the access request is speculative and the storage device is hazardous; and when the master device receives the negative acknowledgment, it issues a renewed access request.

2. A method of accessing slave storage devices by a master device according to claim 1, wherein the negative acknowledgment is also sent by the slave device if it is busy and access cannot be proceeded with.

3. A method of accessing slave storage devices by a master device according to claim 1, wherein the slave device responds with a positive acknowledgment if:

the slave device is non-hazardous and can deal with the request; or the slave device is hazardous, the request is non-speculative and the slave device can deal with the request.

4. A data processing system, comprising:

a first conductor for transferring a speculative signal, the speculative signal specifying whether a bus cycle is speculative;

a second conductor for transferring a slave response signal;

a bus master, coupled to said first and second conductors, said bus master initiating the bus cycle and providing the speculative signal to said first conductor; and a bus slave, coupled to said first and second conductors, said bus slave providing the slave response signal to said second conductor, said bus slave asserting the slave response signal when said bus slave is non-hazardous and is available to respond to the bus cycle, said bus slave also asserting the slave response signal when said bus slave is hazardous, the bus cycle is non-speculative, and said bus slave is available to respond to the bus cycle.

5. A data processing system as in claim 4, further comprising:

a third conductor, coupled to said bus master and to said bus slave, said third conductor transferring an address recognized signal, the address recognized signal being asserted by said bus slave in response to the bus cycle.

6. A data processing system as in claim 5, further comprising:

a plurality of address conductors, coupled to said bus master and to said bus slave, said plurality of address conductors transferring an address value during the bus cycle.

7. A data processing system as in claim 5, wherein the address recognized signal remains negated during the bus cycle if no bus slave is located at the address value.

8. A data processing system, comprising:

a first conductor for transferring a speculative signal, the speculative signal specifying whether a bus access is speculative;

a second conductor for transferring a slave response signal;

a bus master, coupled to said first and second conductors, said bus master initiating the bus access and providing the speculative signal to said first conductor; and a bus intermediary, coupled to said first and second conductors, said bus intermediary providing the slave response signal to said second conductor, said bus intermediary asserting the slave response signal when the bus access is to a non-hazardous device and the non-hazardous device is available to respond to the bus access, said bus intermediary also asserting the slave response signal when the bus access is to a hazardous device, the bus access is non-speculative, and the hazardous device is available to respond to the bus access.

9. A data processing system as in claim 8, further comprising:

a third conductor, coupled to said bus master and to said bus intermediary, said third conductor transferring an address recognized signal, the address recognized signal being asserted by said bus intermediary in response to the bus access.

10. A data processing system as in claim 9, further comprising:

a plurality of address conductors, coupled to said bus master and to said bus intermediary, said plurality of address conductors transferring an address value during the bus access.

11. A data processing system as in claim 10, wherein the address recognized signal remains negated during the bus cycle if no device is located at the address value.

12. A data processing system as in claim 8, further comprising:

an external bus, coupled to said bus intermediary;

wherein said bus intermediary accesses the non-hazardous device by way of said external bus when the bus access is to the non-hazardous device and the non-hazardous device is available to respond to the bus access, and wherein said bus intermediary accesses the hazardous device when the bus access is to the hazardous device, the bus access is non-speculative, and the hazardous device is available to respond to the bus access.

13. A data processing system as in claim 8, wherein said bus intermediary comprises:

a plurality of address inputs for receiving a received address value during the bus access;

a first storage circuit for storing a base address value; and a first circuit, coupled to said plurality of address inputs and to said first storage circuit, said first circuit comparing the received address value and the base address value to produce a comparison result.

14. A data processing system as in claim 13, wherein said bus intermediary further comprises:

a second circuit, coupled to said first circuit and to said second conductor, said second circuit providing the slave response signal to said second conductor; and wherein a present logic state of the slave response signal is determined by the comparison result and by the speculative signal.

15. A data processing system as in claim 14, wherein said bus intermediary further comprises:

a second storage circuit for storing a mask value.

* * * * *